Patented Dec. 26, 1939

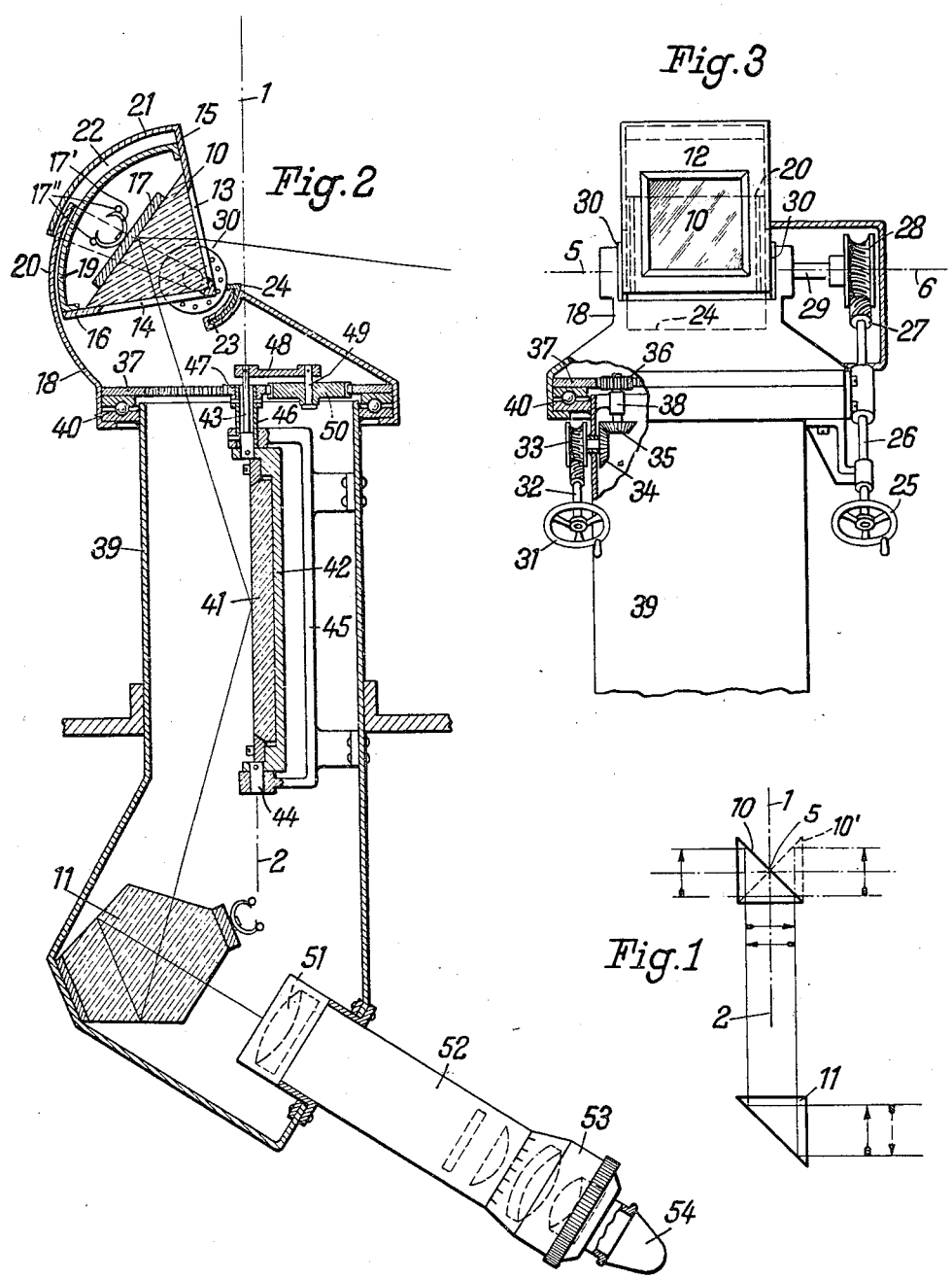

2,184,615

UNITED STATES PATENT OFFICE 2,184,615

OPTICAL DEVICE

Wolfgang Günther, Berlin-Friedenau, Germany, assignor to Askania-Werke A. G., a corporation of Germany Application March 9, 1937, Serial No. 129,959
In Germany March 9, 1936

3 Claims. (Cl. 88—68)

This invention relates to an optical system which is more particularly adapted for use in, or in connection with, periscopes, i. e., instruments for obtaining a panoramic view or a part thereof.

One object of this invention is to provide an optical system for obtaining a wide range of vision, by unobstructed scanning in azimuth and elevation.

A further object is to provide for the aforementioned purpose an optical system having a minimum of reflecting elements, thereby limiting the loss of light intensity caused by each of such elements and obtaining a brighter image than it was heretofore possible.

Further aims, objects and advantages will appear from a consideration of the description which follows with the accompanying drawing showing an embodiment of the invention for illustrative purposes. It is to be understood, however, that the description is not to be taken in a limiting sense, the scope of the invention being defined by the appended claims.

Referring to the drawing:

Fig. 1 is a diagram illustrating the effect of inversion or inclination of the image in a periscope.

Fig. 2 is a sectional side elevation of a periscope embodying the invention.

Fig. 3 is a front elevation of the same instrument, partly in section.

A simple periscopic instrument, consisting of two reflecting prisms 10 and 11 is shown in Fig. 1. The prism 11 is stationary while the prism 10 is rotatable about an axis 1—2 to permit a panoramic view. An object, represented in the drawing by an upright arrow, will appear upright in the prism 11 if the prism 10 is facing to the left. The arrow and the corresponding position of the prism are indicated in solid lines. If, however, the prism 10 is turned about a vertical axis to view an upright object in a different azimuthal direction the image will appear inverted or inclined. For example, an object positioned at the right side of the instrument appears upside down in the lower prism 11 as is indicated by an arrow shown in dotted lines together with the corresponding position of the prism 10'. It therefore appears, that an object which appears upright in one azimuthal position of the rotatable prism will appear horizontal after a rotation of the prism by 90 degrees, and upside down after a rotation of 180 degrees.

It is common practice to compensate for this "inclination error" by means of a reflecting element interposed in the path of light. As a ray of light reflected by an inclined reflecting surface is deflected by twice the angle of incidence, it is only necessary to turn the said surface by half the amount of the rotatable or scanning prism to obtain a correct image.

If the scanning prism is inclined or tilted with respect to an horizontal axis 5—6 in order to scan objects below and above the horizontal plane it will be noted that in an arrangement according to Fig. 1 the view is limited. An object, for instance, having an elevation of about 90 degrees above the horizontal cannot be detected with the instrument. I therefore incline the path of light between the scanning and the stationary prism so that rays of light from the stationary prism strike the reflecting face of the scanning prism at an angle to its axis of azimuthal rotation, thereby obtaining an enlarged scanning range including the vertical, as will become further apparent from Figs. 2 and 3 showing in elevation a periscope embodying this invention.

As shown in Figs. 2 and 3 the scanning prism 10 is mounted in a prism-casing 12 having apertures 13 and 14 in plane faced walls 15 and 16 against which the prism 10 is resting under action of a plate 17 provided with a spring 17' bearing against stops 17". The casing with the prism is tiltable about a substantially horizontal axis 5—6 with respect to a second casing 18. Rear walls 19 and 20 of both casings are curved concentrically to the tilting axis 5—6 leaving only a narrow space between the walls in order to prevent light or dust from entering the casings. The prism-casing is further provided with a lid 21 overlapping the rear and side walls of the second casing and forming a pocket 22 with the walls of the prism-casing into which the second casing projects. In a similar way the second casing 18 is provided with a pocket 23 oppositely to the tilting axis 5—6 into which a curved wall or extension 24 of the prism-casing projects.

The prism 10 is tiltable in elevation by operating a handwheel 25 driving a shaft 26 and a worm 27. The gear 28 meshing with the worm 27 turns the elevation shaft 29 to which the prism-casing is secured by means of flanges 30.

The prism 10 is rotatable in azimuth by operating a second handwheel 31, driving a worm and gear 32 and 33, bevel gears 34 and 35 and a pinion 36 meshing with a large gear 37 having teeth at the inside. The shaft of the pinion is rotatably mounted in a bracket 38 secured to a standard or stationary housing 39. The housing is shown as supporting the rotatable head, consisting of casings 12 and 13, by means of a roller bearing 40.

A reflecting element shown as being a mirror 41 with an external reflecting surface is rotatably mounted about an axis parallel to or coinciding with the azimuth axis 1—2 within the stationary housing. For this purpose the mirror 41 is shown as supported by a frame 42 and the latter mounted in trunnions 43 and 44 within a bracket 45 secured to the stationary housing. The upper arm of the bracket 45 is provided with a sleeve 46 secured thereto and bearing a fixed pinion 47. The trunnion 43 extends through said sleeve and bears an arm or web 48 secured thereto and provided with a pin 49 for rotatably supporting a gear 50. The gear 50 meshes with the stationary pinion 47 and the rotatable gear 37, thus forming a differential gear. It appears, that upon rotation of the head 12, 13 in azimuth about a certain angle, the mirror 41 will be turned about half that angle.

There is further provided a reflecting member shown as being a prism 11 for deflecting the path of light into the objective 51 of a suitable telescope 52 for enlarging the image. Refracting elements of the telescope are indicated by dotted lines. The telescope may be of conventional construction and is shown as provided with the usual focussing ring 53 and eyepiece 54.

The operation of the device is as follows. In the position shown in the drawing the rays entering the scanning prism 10 are reflected onto the reflecting surface 41 and thence into the stationary prism 11 and the objective 51. The reflecting surface 41 permits an emission of rays from the scanning prism at an angle to the azimuth axis. In the position shown the prism 10 is tilted for an observation of an object below the horizontal 34, but it may be tilted upwardly until the entering rays are substantially parallel with the azimuth axis. This feature therefore permits an enlargement of the scanning range of the device. When the scanning prism is turned in azimuth the reflecting surface is automatically turned about half the azimuth angle to compensate for the inclination error as hereinbefore explained. The reflecting surface 41 thus serves a double purpose, namely inclination of the emitted rays of the scanning prism with regard to the azimuth axis, and further the compensation of the inclination error. The advantage of providing one single element for this double purpose is a simplification of the optical system by reducing the number of light consuming reflecting or refracting surfaces which results in a brighter image.

Obviously the present invention is not restricted to the embodiment herein shown and described. Changes may be made within the scope of the invention for example by substituting reflecting mirrors for prisms and vice versa. Moreover, it is not indispensable that all the features of the invention be used conjointly, since they may be employed advantageously in various combinations and subcombinations.

What is claimed is:

1. An optical device comprising, in combination, a substantially vertical housing; a supporting casing mounted on the upper end of the housing for turning movement about a substantially vertical axis and having a portion offset laterally with respect to the housing; a first reflector mounted in the offset portion of said casing for tilting movement about a substantially horizontal axis parallel with its reflecting surface; means connected to tilt said reflector to direct reflected rays downwardly into the casing at an angle to the vertical; a second reflector comprising a mirror mounted for turning movement within the housing at the opposite side from the offset portion of the casing and substantially parallel with the turning axis of the supporting casing and facing toward the first reflector to intercept and reflect the angular rays downwardly into the housing at a reflected angle to the vertical; means for turning both of said reflectors in such manner that the second reflector turns about half the turning angle of the first reflector; and means to receive and direct the reflected rays from the housing.

2. An optical device comprising, in combination, a substantially vertical housing; a supporting casing mounted on the upper end of the housing for turning movement about a vertical axis and having a portion offset laterally with respect to the housing; a first reflector mounted in the offset portion of said casing for tilting movement about a horizontal axis parallel and spaced forwardly from its reflecting surface; means connected to tilt said reflector to direct reflected rays downwardly into the housing at an angle to the vertical; a second reflector comprising a plane mirror mounted for turning movement within the housing in the opposite side thereof from the offset portion of the supporting casing and connected for turning movement within the housing about a vertical axis having its reflecting surface parallel with said turning axis and facing toward the first reflector to intercept and reflect the angular rays into the lower portion of the housing at a reflected angle to the vertical; means for turning both of said reflectors in such manner that the second reflector turns about half the turning angle of the first reflector; and means to receive and direct the reflected rays from the housing.

3. A periscopic instrument of the character described comprising, in combination, a substantially vertical stationary housing; a supporting casing mounted on the upper end of the housing for turning movement about a substantially vertical axis and having a portion offset laterally with respect to the vertical axis of the housing; a reflecting prism mounted in the offset portion of said casing for tilting movement about a substantially horizontal axis parallel with and spaced forwardly from the reflecting face of said prism; means connected to tilt said prism to deflect reflected rays downwardly into the housing at an angle to the vertical; a second reflector mounted for turning movement within the housing and having a plane reflecting first surface substantially parallel with the turning axis of the supporting casing and facing toward the reflecting face of the prism to intercept and reflect the angular rays downwardly into the housing at a reflected angle to the vertical; means for turning said prism and said mirror in such manner that the mirror turns about half the turning angle of the prism; and means to receive and direct the reflected rays from the housing.

WOLFGANG GÜNTHER.